(12) United States Patent
Sunkara et al.

(10) Patent No.: US 8,638,356 B2
(45) Date of Patent: Jan. 28, 2014

(54) COMMUNICATION SYSTEM

(75) Inventors: Ramu Sunkara, Los Altos, CA (US); Alexander Markov, San Francisco, CA (US)

(73) Assignee: Skype, Dublin (IE)

( * ) Notice: Subject to any disclaimer, the term of this patent is extended or adjusted under 35 U.S.C. 154(b) by 232 days.

(21) Appl. No.: 13/179,220

(22) Filed: Jul. 8, 2011

(65) Prior Publication Data

US 2013/0010054 A1    Jan. 10, 2013

(51) Int. Cl.
*H04N 7/14* (2006.01)
(52) U.S. Cl.
CPC .................................... *H04N 7/14* (2013.01)
USPC ................... 348/14.11; 348/14.12; 348/14.08
(58) Field of Classification Search
USPC ............. 348/14.01–14.16; 709/204–205, 227
See application file for complete search history.

(56) References Cited

U.S. PATENT DOCUMENTS

| | | | | |
|---|---|---|---|---|
| 2003/0088767 A1* | 5/2003 | Emerson, III | ................. | 713/153 |
| 2004/0081160 A1 | 4/2004 | Rousseau | | |
| 2005/0254510 A1* | 11/2005 | Oja et al. | ...................... | 370/431 |
| 2005/0286504 A1* | 12/2005 | Kwon | ........................... | 370/356 |
| 2007/0276947 A1* | 11/2007 | Panattu et al. | ................ | 709/227 |

FOREIGN PATENT DOCUMENTS

EP    1770948    9/2006

OTHER PUBLICATIONS

"International Search Report and Written Opinion", Application No. PCT/US2012/045880, (Oct. 29, 2012),18 pages.

* cited by examiner

*Primary Examiner* — Melur Ramakrishnaiah
(74) *Attorney, Agent, or Firm* — Wolfe-SBMC

(57) ABSTRACT

A computer-implemented system and method are described for improving the QoE of real-time video sessions between mobile users. For example, a method according to one embodiment of the invention comprises: configuring one or more servers on the perimeter of a service provider network; receiving a request from a first mobile device to establish a real-time communication session with a second mobile device; providing the first and second mobile devices with networking information for connecting to the servers; and establishing the real-time communication session through the server.

24 Claims, 7 Drawing Sheets

COMMUNICATION SYSTEM

BACKGROUND

1. Field of the Invention

This invention relates generally to the field of data networking. More particularly, the invention relates to an improved data communication system.

2. Description of the Related Art

Internet users today may communicate using a variety of different client applications including real-time messaging applications (e.g., instant messaging or "chat" applications) and real-time, two-way video applications. For example, certain client applications (such as, for example, the "Qik" client developed by Qik, Inc.), allow users to participate in two-way live video chat over 3G and 4G cellular phone networks.

FIGS. 1a-b illustrate an exemplary configuration in which two mobile devices 101-102 participate in a two-way video chat. FIG. 1a illustrates control/signaling data routing used to establish a two-way video connection and FIG. 1b illustrates the media data (i.e., the actual video streams) being transmitted between the two mobile devices 101-102. The control/signaling is typically carried using a transmission control protocol (TCP) or user datagram protocol (UDP) network transport and the media data is typically carried using a UDP network transport.

As illustrated, the path taken by both the control/signaling and media data includes a phone subnetwork 105 which may be a standard wireless cellular network (e.g., such as a 3G or 4G network). The phone subnetwork 105 is connected to a service sub-network 115 via a router 110. The service sub-network is a data network used to support mobile data traffic and route the data traffic over the Internet 125 via an external firewall 120. The phone subnetwork 105 and service subnetwork 115 are maintained by a wireless service provider such as T-Mobile™, AT&T™, or Verizon™.

Currently, to enable real-time video conversations between the mobile devices 101-102, each of the mobile devices must be connected over the Internet 125 to a common set of streaming servers 150. Each mobile device 101-102 opens its own UDP datagram socket to the streaming servers 105 and the streaming servers then route the datagrams containing the video content over the appropriate datagram sockets. For example, the streaming servers 150 route video received from mobile device 101 over mobile device 102's datagram socket connection and vice versa.

One drawback of this configuration is that because each mobile device 101-102 must connect to a streaming server over the Internet 125, significant latency may be introduced. Consequently, a more efficient way to route video between the mobile devices 101-102 would be desirable.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. For example, embodiments of the invention are described below within the context of real-time video applications, the underlying principles of the invention are not limited to any particular type of media communication. Additionally, while the discussion below focuses on specific service provider networks, the underlying principles of the invention are applicable to implementations on any form of radio networks. Finally, in some instances, well-known structures and devices are shown in block diagram form to avoid obscuring the underlying principles of the embodiments of the invention.

One embodiment of the invention improves the quality of experience for end users when conducting real-time video sessions by deploying a set of in-network relays at the perimeter of service provider networks. Specifically, As illustrated in FIGS. 2a-b, in this embodiment, a relay service is configured to communicate over the service subnetwork 115, inside the firewall 120 connecting the service subnetwork 115 to the Internet 125.

Figure 2A:
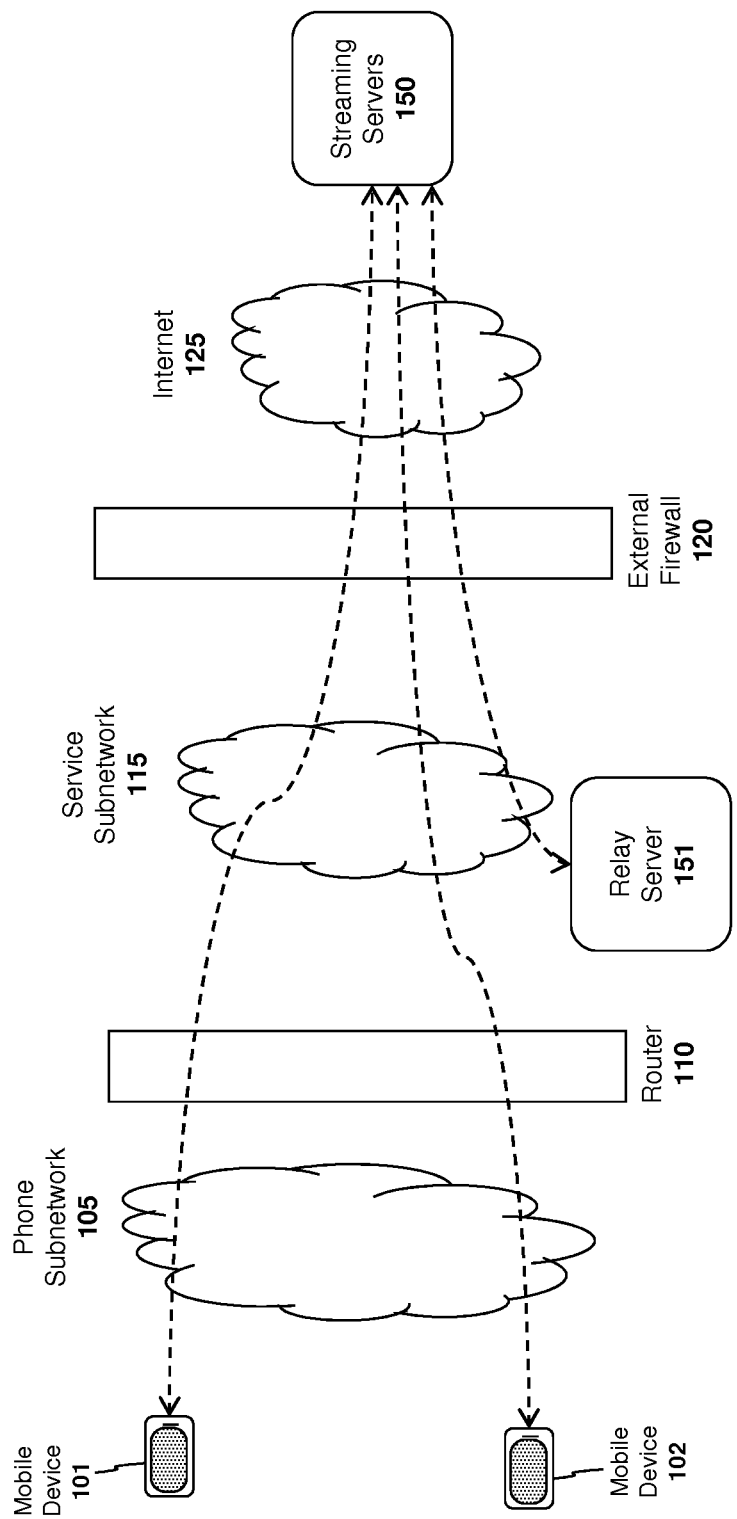
FIGS. 2a-b illustrate techniques for improving latency by placing relay servers on the perimeter of a service provider's network in accordance with one embodiment of the invention.

FIG. 2a illustrates the control/signaling data routing used to establish a relay connection. Client applications installed on the mobile devices 101-102 discover these in network relay server(s) 151 during this control/signaling phase. In one embodiment, each in network relay server(s) 151 is registered with the streaming servers 150 using the outbound connection. In one embodiment, the mobile device 101 initiating the video session initially connects to the streaming servers 150 which then provides the network information needed to connect to the relay service (e.g., IP address and port) to both of the clients 101-102.

In one embodiment, a relay server 151 which is relatively "close" to one or both mobile devices 101, 102 on the network is selected by the streaming servers 150. Note that the proximity of the relay server 151 to the mobile devices 101, 102 may be determined based on network information provided to the streaming servers 150 (e.g., the TCP/IP addresses of the mobile devices and/or the relay server 151). The location of each relay server may be registered with the streaming servers 150 and the streaming servers 150 may use this information to determine the best relay server for servicing each request. Other information such as the current load on each of the relay servers 151 may also be factored in to the decision.

Figure 2B:
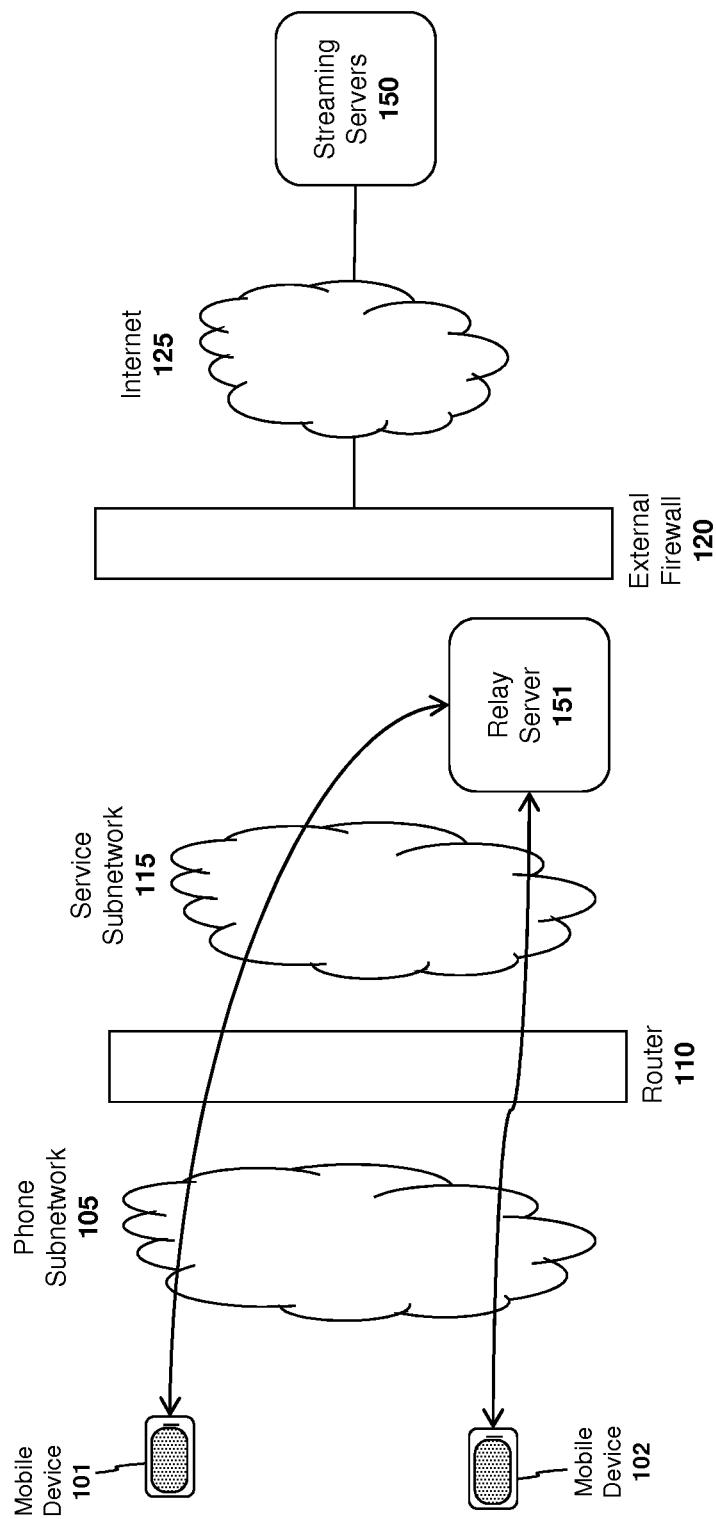

Once the two mobile devices 101-102 have the network information, they connect to the relay server(s) 151, which establishes a real-time video session between the devices, as illustrated in FIG. 2b. In one embodiment, the media connections between the mobile devices 101-102 and the relay server 151 comprises UDP datagram sockets. The relay server(s) 151 receive video content packetized in datagrams from mobile device 101 over a first UDP datagram socket, and route the datagrams over a second UDP datagram socket to mobile device 102, which then extracts and decodes the video content from the UDP datagrams. Conversely, The relay server(s) 151 receive video packetized in datagrams from mobile device 102 over the second UDP datagram socket, and route the datagrams over the first UDP datagram socket to mobile device 101, which then extracts and decodes the video content from the UDP datagrams.

In one embodiment the router 110 is a well known device for routing network packets to an appropriate destination, as identified by the destination address stored in each packet header. For example, the mobile devices 101, 102 may use the TCP/IP address of the streaming servers 150 when sending connection requests to the streaming servers 150. The router 110 will then route the requests to the appropriate destinations.

Figure 1A:
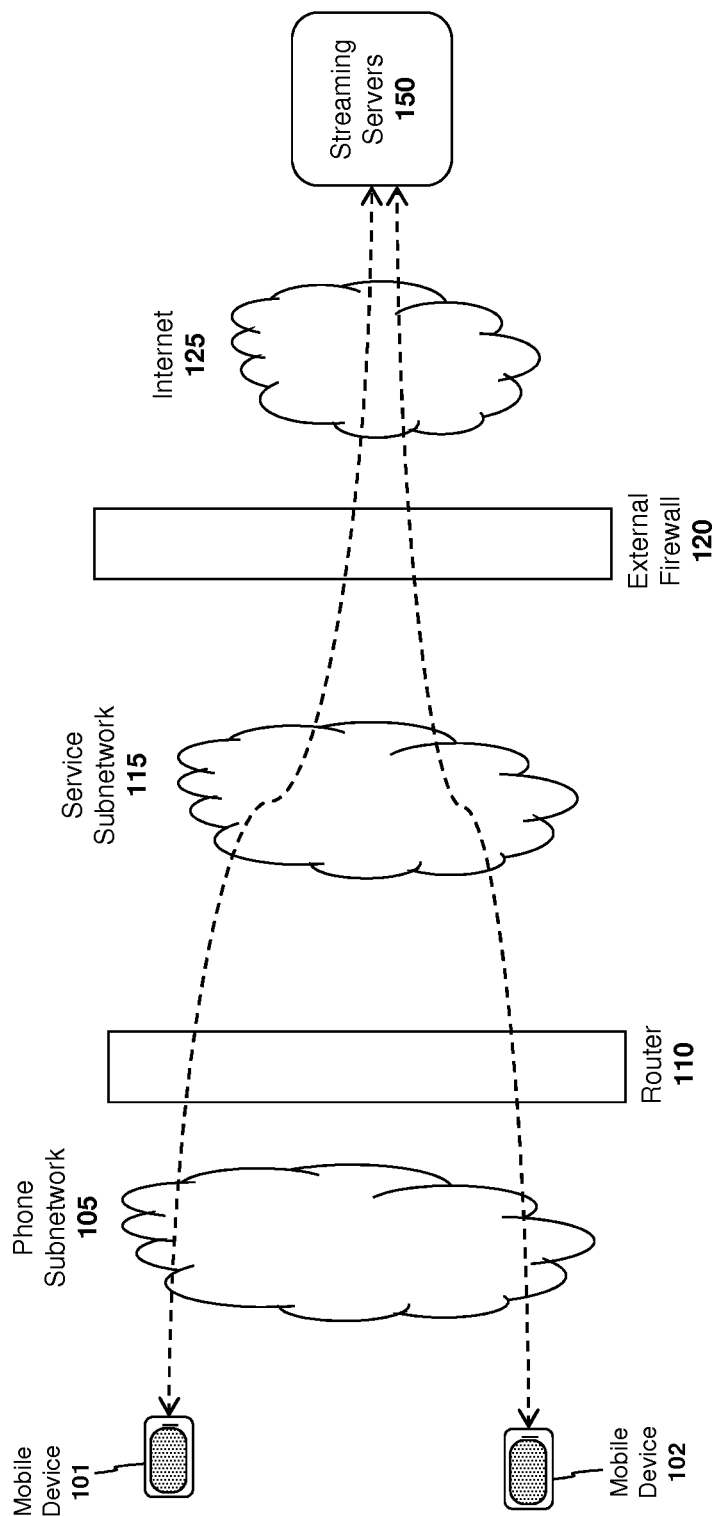
FIGS. 1a-b illustrate current techniques for establishing real time video sessions between two mobile devices.
Figure 1B:
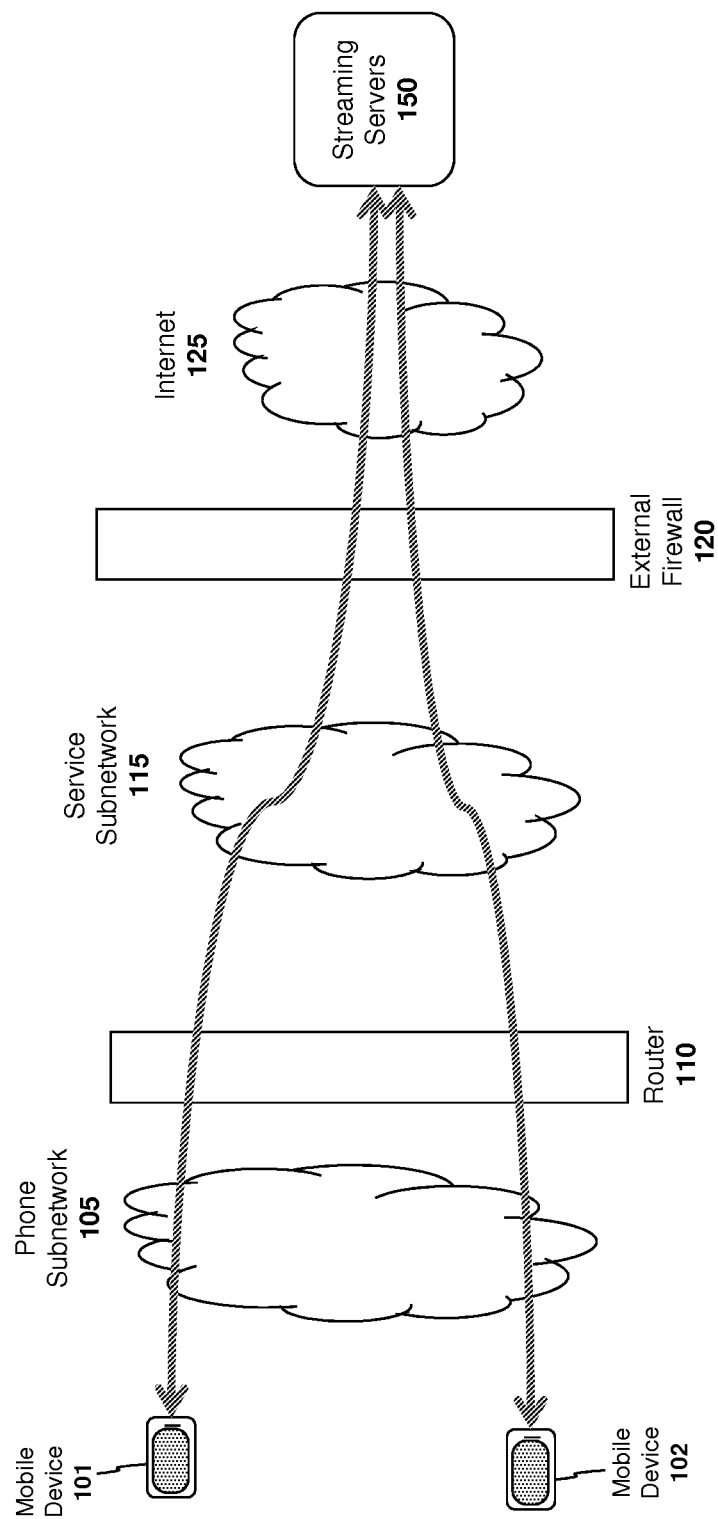

When the embodiments of the invention shown in FIGS. 2a-b are compared against the implementation shown in FIGS. 1a-b, the benefits are clear. Because the media streams do not need to pass through the external firewall 120 and over the Internet 125, latency is significantly reduced, thereby improving the QoE for the end user. By way of example, and not limitation, current testing shows a latency reduction from 252 ms to 110 ms.

While the embodiment described above uses UDP datagrams, it should be noted that the underlying principles of the invention are not limited to any particular network communication protocols.

Figure 3:
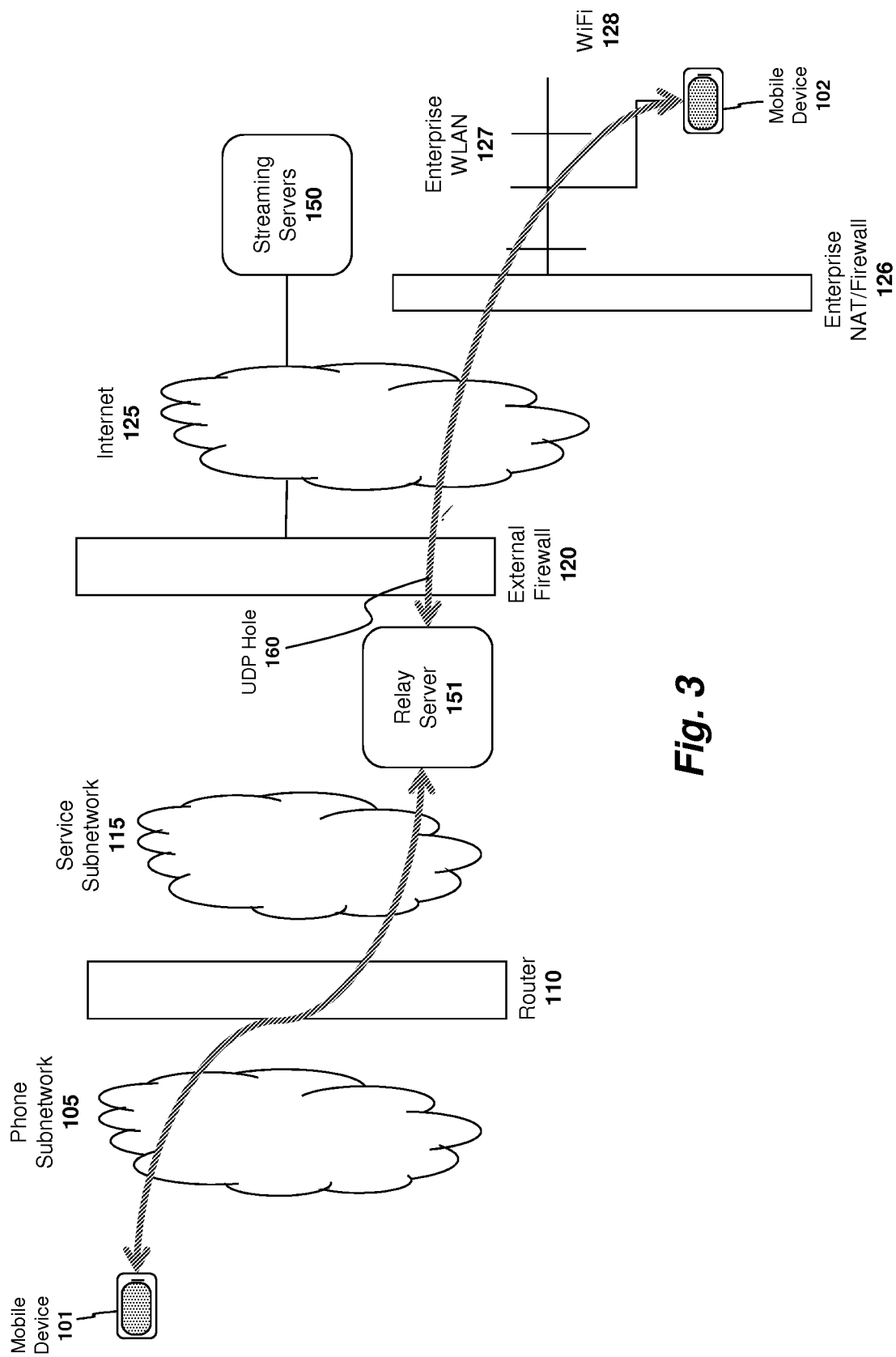
FIG. 3 illustrates a relay service positioned on the perimeter of a service provider's network routing video content between a mobile device connected via a WiFi connection and a mobile device connected via a cellular connection (e.g., a 3G or 4G connection).

FIG. 3 illustrates how the relay server(s) 151 may also be used to establish a two-way video session between a mobile device 102 connected via a WiFi connection and a mobile device 101 connected via a cellular connection (e.g., a 3G or 4G connection). In this embodiment, one of the two devices may initially contact the streaming servers 150 to establish the video session. The streaming servers 150 may then notify the called party and provide the networking information needed for both mobile devices 101-102 to connect with the relay service 151. The relay service 151 then manages the real-time video session as described above (e.g., establishing UDP datagram sockets with each of the respective devices 101-102). To communicate with the mobile device 102 connected via WiFi, the relay server 151 opens a UDP hole 160 through the external firewall 120. Techniques for establishing a UDP hole through a firewall are well known and therefore will not be described in detail herein.

In the particular implementation shown in FIG. 3, the mobile device 102 is connected via a WiFi link over an enterprise WLAN 127, which is connected to the Internet 125 via an enterprise NAT/firewall. While this may represent a common configuration, such a configuration is not required for complying with the underlying principles of the invention.

In one embodiment, multiple relay servers may be set up at convenient locations throughout the perimeter of the service provider's network. Additionally, multiple relay servers may be used to support communication across the service subnetworks of different service providers.

Figure 4A:
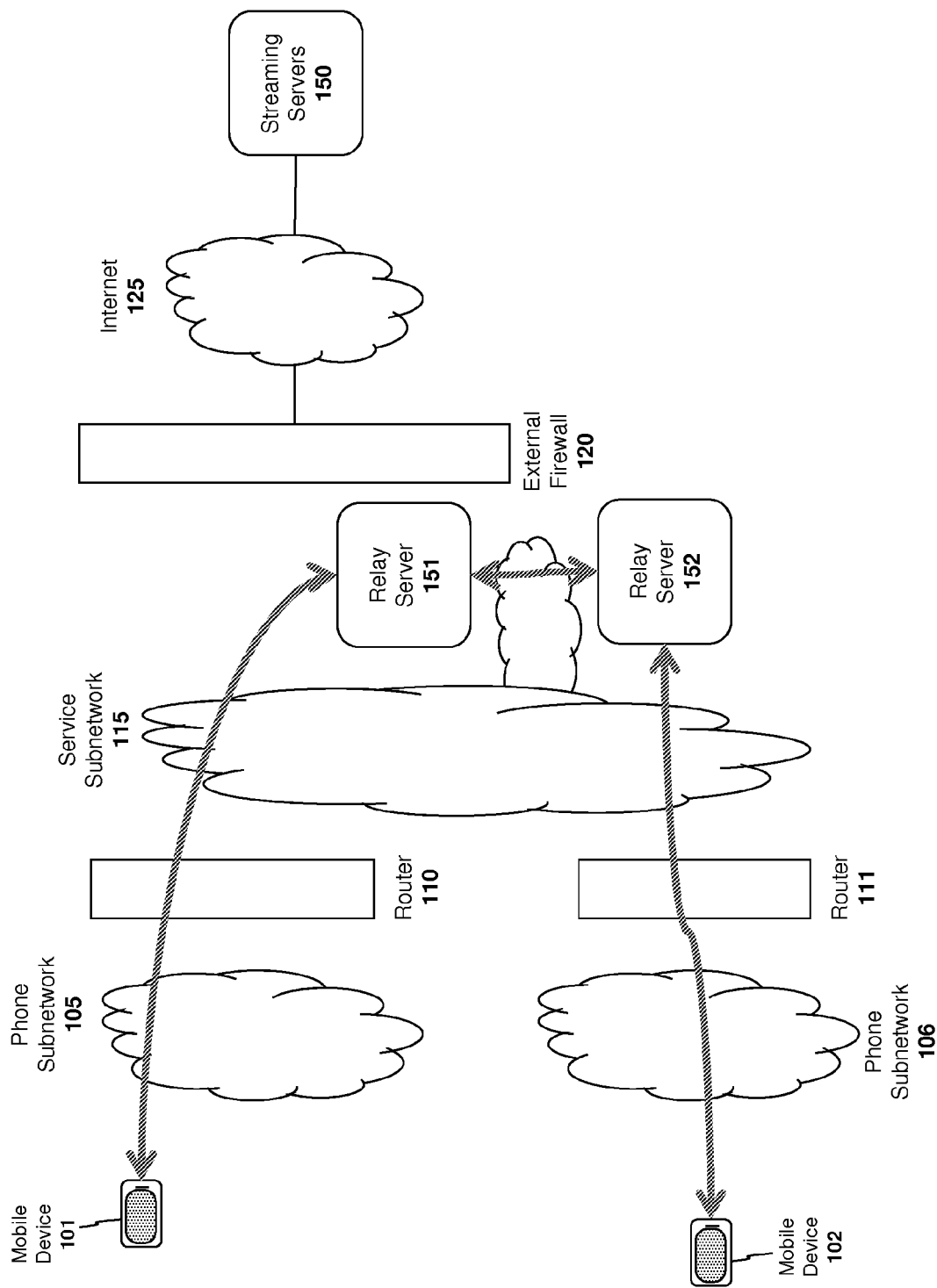
FIGS. 4a-b illustrate two different embodiments in which multiple relay servers are used to establish communication between mobile devices.

FIG. 4a illustrates one embodiment in which relay server 151 and relay server 152 communicate with one another to route UDP datagrams between mobile devices 101 and 102. As in prior embodiments, the mobile device 101 initiating the connection may first contact the streaming servers 150. In response, the streaming servers 150 provide mobile device 101 networking information needed to connect with relay server 151 and mobile device 102 the networking information needed to connect with relay server 152. Upon connecting, the relay servers 151-152 then establish a UDP datagram socket between one another to route the UDP datagram traffic containing the video data.

Figure 4B:
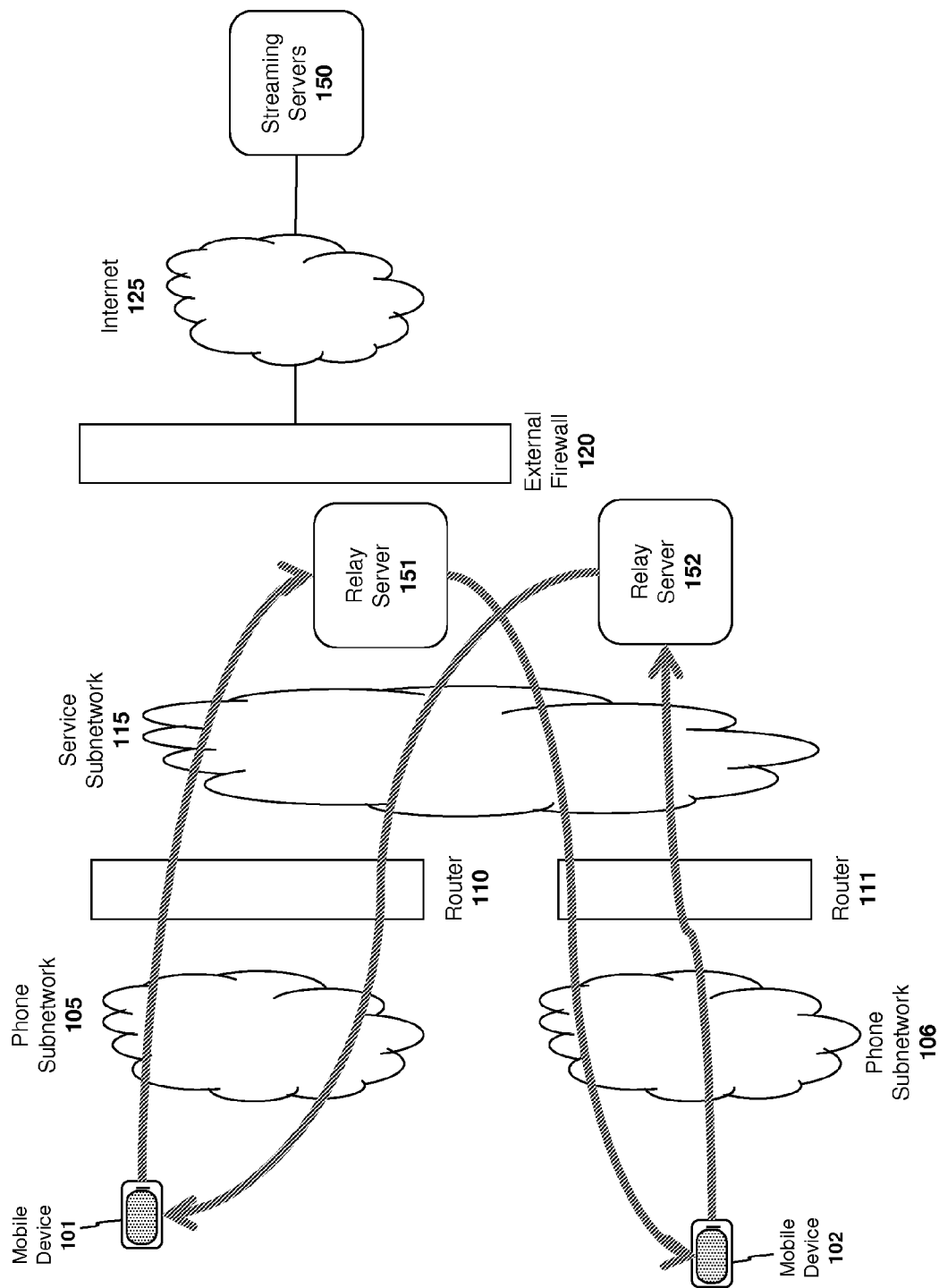

FIG. 4b illustrates an alternate implementation in which relay server 151 receives UDP datagram traffic containing video data from mobile device 101 and routes it to mobile device 102 and the second relay server 152 receives UDP datagram traffic containing video data from mobile device 102 and routes it to mobile device 101. As in the embodiments described above, an initial connection to the streaming servers 150 may be needed to retrieve the networking information needed to connect with the two relay servers 151-152.

While the relay servers 151-152 are configured within the service subnetwork in the discussion above, in other embodiments, some relay servers may be configured within the phone subnetwork 1056-106. In such a case, if both mobile devices are connected to the same subnetwork, a relay server on that subnetwork may be used to connect the devices. If the mobile devices are on different phone subnetworks, however, then a relay server on the service subnetwork 115 may be selected.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components. Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a client P2P application, the underlying principles of the invention may be implemented in the form of a server application or any other form of client application. Accordingly, the scope and spirit of the invention should be judged in terms of the claims which follow.

What is claimed is:

1. A computer-implemented method comprising:
  receiving at a streaming service a request from a first mobile device to establish a real-time communication session with a second mobile device; and
  in response to the request, providing the first and second mobile devices with networking information for connecting to one or more relay servers located within a subnetwork of a service provider network inside of an external firewall connecting the subnetwork over the Internet to the streaming service, the networking information sufficient to enable the mobile devices to conduct the real-time communication session through the one or more relay servers within the subnetwork.

2. The method as in claim 1 wherein the networking information includes locations of the one or more relay servers.

3. The method as in claim 1 wherein receiving further comprises: receiving the request at a server configured to implement the streaming service, the server located outside of the service provider network.

4. The method as in claim 3 further comprising: registering the one or more relay servers with the server located outside of the service provider network.

5. The method as in claim 1 wherein the real-time communication session comprises a real-time, two-way video communication session.

6. The method as in claim 1 wherein the networking information includes an IP address of the one or more relay servers.

7. The method as in claim 1 wherein the service provider comprises a cellular service provider.

8. The method as in claim 1 wherein two or more relay servers are used to establish the real-time communication session.

9. The method as in claim 8 wherein a first one of the relay servers communicates directly with a first one of the mobile devices and a second one of the relay servers communicates directly with a second one of the mobile devices and wherein the first and second relay servers establish socket connections between one another.

10. The method as in claim 8 wherein a first one of the relay servers receives an input stream from a first one of the mobile devices and routes the input stream to a second one of the mobile devices and wherein a second one of the relay servers receives an input stream from the second one of the mobile devices and routes the input stream to the first one of the mobile devices.

11. The method as in claim 1 further comprising: determining the one or more relay servers to use for the real-time communication session based upon proximity of the one or more relay servers to the mobile devices.

12. The method as in claim 1 wherein the one or more relay servers are configured on a phone subnetwork to which the first and second mobile devices are connected.

13. A computer-implemented method comprising:
sending a request from a first mobile device to establish a real-time communication session with a second mobile device, the request sent to a streaming server located outside of a subnetwork to which the first and second mobile devices are connected;
obtaining by the first mobile device networking information for connecting to one or more relay servers located within the subnetwork inside of an external firewall connecting the subnetwork across the Internet to the streaming server; and
establishing by the first mobile device the real-time communication session through the one or more relay servers server using the networking information that is obtained.

14. The method as in claim 13 wherein the request is configured by the first mobile device to cause the streaming server located outside of the service provider network to provide the first and second mobile devices with the networking information.

15. The method as in claim 13 wherein the networking information comprises a location of the one or more relay servers registered with the streaming server located outside of the service provider network.

16. The method as in claim 13 wherein the real-time communication session comprises a real-time, two-way video communication session.

17. The method as in claim 13 wherein the networking information includes an IP address of the one or more relay servers.

18. The method as in claim 13 wherein the service provider comprises a cellular service provider.

19. The method as in claim 13 wherein two or more relay servers are used to establish the real-time communication session.

20. The method as in claim 19 wherein a first one of the relay servers communicates directly with a first one of the mobile devices and a second one of the relay servers communicates directly with a second one of the mobile devices and wherein the first and second relay servers establish socket connections between one another.

21. The method as in claim 19 wherein a first one of the relay servers receives an input stream from a first one of the mobile devices and routes the input stream to a second one of the mobile devices and wherein a second one of the relay servers receives an input stream from the second one of the mobile devices and routes the input stream to the first one of the mobile devices.

22. The method as in claim 13 wherein the method is performed by a client application installed on the first mobile device and configured to enable real-time, two-way communication sessions with other mobile devices through the one or more relay servers.

23. A client device comprising:
processing hardware; and
machine-readable media storing instructions to implement a communication client application via the processing hardware configured to perform operations including:
sending a request to establish a real-time communication session with an other client device, the request sent to a streaming server located outside of a service subnetwork to which said client devices are connected;
obtaining by the client device networking information for connecting to one or more relay servers located within the service subnetwork; and
establishing the real-time communication session with the other client device through the one or more relay servers using the networking information that is obtained, the real-time communication session.

24. The client device of claim 23 wherein media streams associated with the real-time communication session are communicated between the client device and the other client device by the one or more relay servers within the service subnetwork and do not pass over the Internet.

* * * * *